(12) United States Patent
Sellers et al.

(10) Patent No.: US 10,999,387 B2
(45) Date of Patent: *May 4, 2021

(54) CENTRALIZED COMMUNICATION INTERFACE FOR CHANNEL INTEGRATION AND INTERACTION EXPANSION

(71) Applicant: BANK OF AMERICA CORPORATION, Charlotte, NC (US)

(72) Inventors: John Allen Sellers, Kennett Square, PA (US); Jill A. Calabrese Bain, Mansfield, MA (US); Allison Mensing Corbett, Cohasset, MA (US); Victoria Lynn Dravneek, Charlotte, NC (US); Christine Lee Fitzgerald, Boston, MA (US); Mazen Ghurani, Sherman Oaks, CA (US); Brian J. Kehner, Wilmington, DE (US); James P. Kirkman, Acton, MA (US); Richard M. Korzenko, Fort Mill, SC (US); James P. Massman, Winchester, MA (US); Matthew Brian Wohl, Hamilton, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,437

(22) Filed: Jul. 2, 2020

(65) Prior Publication Data
US 2020/0336558 A1    Oct. 22, 2020

Related U.S. Application Data

(63) Continuation of application No. 16/353,143, filed on Mar. 14, 2019, now Pat. No. 10,708,372.

(Continued)

(51) Int. Cl.
*G06F 15/16* (2006.01)
*H04L 29/08* (2006.01)
*G06Q 30/02* (2012.01)

(52) U.S. Cl.
CPC ......... *H04L 67/22* (2013.01); *G06Q 30/0226* (2013.01); *H04L 67/306* (2013.01); *H04L 67/10* (2013.01)

(58) Field of Classification Search
CPC ....... H04L 67/10; H04L 67/22; H04L 67/306; G06Q 30/0226
See application file for complete search history.

(56) References Cited

U.S. PATENT DOCUMENTS

| RE39,090 E | 5/2006 | Beauregard et al. |
| 7,103,556 B2 | 9/2006 | Del Rey et al. |

(Continued)

*Primary Examiner* — Jonathan A Bui
(74) *Attorney, Agent, or Firm* — Michael A. Springs; Moore & Van Allen PLLC; R. W. McCord Rayburn (57) ABSTRACT

A system for communication channel integration is provided. The system comprising: a memory device with computer-readable program code stored thereon; a communication device connected to a network; and at least one processing device, wherein the at least one processing device is configured to execute the computer-readable program code to: generate a user data collection comprising one or more accounts and interactions associated with a first user, wherein the user data collection is accessible by the first user over a first communication channel; monitor the user data collection; based on monitoring the user data collection and user interactions, determine an actionable event associated with the first user; identify a second communication channel associated with a second user and associated with the actionable event; and in response to determining the actionable event, automatically integrate the second communication channel into the first communication channel thereby creating a merged communication channel.

20 Claims, 5 Drawing Sheets

Related U.S. Application Data (60) Provisional application No. 62/774,765, filed on Dec. 3, 2018.

(56) References Cited

U.S. PATENT DOCUMENTS

| | | | |
|---|---|---|---|
| 7,315,837 B2 | 1/2008 | Sloan et al. | |
| 7,813,983 B2 | 10/2010 | Wottowa et al. | |
| 7,818,183 B2 | 10/2010 | Schoenberg | |
| 7,835,928 B2 | 11/2010 | Schoenberg | |
| 7,895,061 B2 | 2/2011 | Schoenberg | |
| 7,933,783 B2 | 4/2011 | Schoenberg | |
| 7,937,275 B2 | 5/2011 | Schoenberg | |
| 8,498,913 B2 | 7/2013 | Jenson et al. | |
| 8,510,130 B2 | 8/2013 | Schoenberg | |
| 8,521,553 B2 | 8/2013 | Schoenberg | |
| 8,599,836 B2 | 12/2013 | Van Buren et al. | |
| 8,650,318 B2 | 2/2014 | Thomas | |
| 8,934,614 B2 | 1/2015 | Altberg et al. | |
| 9,042,540 B2 | 5/2015 | Tuchman et al. | |
| 9,094,506 B2 | 7/2015 | Altberg et al. | |
| 9,245,287 B2 | 1/2016 | Gechter et al. | |
| 9,419,951 B1 | 8/2016 | Felsher et al. | |
| 9,514,327 B2 | 12/2016 | Ford | |
| 9,613,190 B2 | 4/2017 | Ford et al. | |
| 10,033,702 B2 | 7/2018 | Ford et al. | |
| 10,298,640 B1 | 5/2019 | Luke et al. | |
| 10,567,904 B2 | 2/2020 | Sahay | |
| 2005/0198299 A1 | 9/2005 | Beck et al. | |
| 2012/0150602 A1 | 6/2012 | Bennett et al. | |
| 2012/0257112 A1 | 10/2012 | Fritsch | |
| 2015/0147996 A1* | 5/2015 | Hobby | H04L 69/16 455/404.1 |
| 2015/0242894 A1 | 8/2015 | Gopal | |
| 2015/0244539 A1 | 8/2015 | Ickman et al. | |
| 2015/0245094 A1 | 8/2015 | Schneider et al. | |
| 2016/0006574 A1* | 1/2016 | Fahlgren | H04L 67/18 370/261 |
| 2016/0119478 A1* | 4/2016 | Sharpe | H04M 3/5191 379/265.09 |
| 2016/0142541 A1* | 5/2016 | Sharpe | H04M 3/5141 379/92.01 |
| 2018/0213046 A1 | 7/2018 | Cherdabayev et al. | |
| 2019/0108342 A1 | 4/2019 | Conikee et al. | |

\* cited by examiner

CENTRALIZED COMMUNICATION INTERFACE FOR CHANNEL INTEGRATION AND INTERACTION EXPANSION

CROSS-REFERENCE TO RELATED APPLICATIONS

This application is a non-provisional filing of U.S. patent application Ser. No. 16/353,143 filed Mar. 14, 2019, which in turn is a non-provisional filing of U.S. Provisional Application No. 62/774,765 filed Dec. 3, 2018, the contents of both of which are hereby incorporated by reference herein.

FIELD OF THE INVENTION

The present invention is directed to, in general, a user interface and communication hub configured for tracking user interactions and integrating a plurality of communication channels.

BACKGROUND

Entity user interfaces are commonly used by individuals to perform a variety of activities. A need exists for an improved user interface application having integrated complex communication channels.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for managing electronic resource transfers based on established smart contract requirements within a block chain distributed network environment. A system for communication channel integration is provided. The system comprises: a memory device with computer-readable program code stored thereon; a communication device connected to a network; and at least one processing device, wherein the at least one processing device is configured to execute the computer-readable program code to: generate a user data collection comprising one or more accounts and interactions associated with a first user, wherein the user data collection is accessible by the first user over a first communication channel; monitor the user data collection; based on monitoring the user data collection and user interactions, determine an actionable event associated with the first user; identify a second communication channel associated with a second user and associated with the actionable event; and in response to determining the actionable event, automatically integrate the second communication channel into the first communication channel thereby creating a merged communication channel.

In one specific embodiment, the at least one processing device is further configured to execute the computer-readable program code to display at least a portion of the user data collection to the second user over the merged communication channel on a user device associated with the second user. In another embodiment, the at least one processing device is further configured to execute the computer-readable program code to request permission from the first user before integrating the second communication channel into the first communication channel. In yet another embodiment, the second communication channel is associated with a third party resource advisor. In yet another embodiment, the second communication channel comprises at least one of a video communication, an audio communication, and a text communication.

In yet another embodiment, the actionable event is a user interaction with an input device, the first user interacting with an interface displayed by a user application. In yet another embodiment, the actionable event comprises a duration of the one or more accounts exceeding a predetermined threshold. In yet another embodiment, the actionable event comprises a resource amount stored in the one or more accounts exceeding a predetermined threshold.

In yet another embodiment, the at least one processing device is further configured to execute the computer-readable program code to provide a reward to the first user based on the actionable event and the user data collection, and wherein the reward is exclusive to an interface of a user application.

A computer program product for communication channel integration is also provided. The computer program product comprises at least one non-transitory computer-readable medium comprising computer-readable instructions, the computer-readable instructions, when executed by at least one processing device, cause the at least one processing device to: generate a user data collection comprising one or more accounts and interactions associated with a first user, wherein the user data collection is accessible by the first user over a first communication channel; monitor the user data collection; based on monitoring the user data collection and user interactions, determine an actionable event associated with the first user; identify a second communication channel associated with the actionable event; and in response to determining the actionable event, automatically integrate the second communication channel into the first communication channel thereby creating a merged communication channel.

In one specific embodiment, the computer-readable instructions, when executed by the at least one processing device, cause the at least one processing device to display at least a portion of the user data collection to the second user over the merged communication channel on a user device associated with the second user. In another embodiment, the computer-readable instructions, when executed by the at least one processing device, cause the at least one processing device to request permission from the first user before integrating the second communication channel into the first communication channel. In yet another embodiment, the second communication channel is associated with a third party resource advisor. In yet another embodiment, the second communication channel comprises at least one of a video communication, an audio communication, and a text communication.

In yet another embodiment, the actionable event is a user interaction with an input device, the first user interacting with an interface displayed by a user application. In yet another embodiment, the actionable event comprises a duration of the one or more accounts exceeding a predetermined threshold. In yet another embodiment, the actionable event comprises a resource amount stored in the one or more accounts exceeding a predetermined threshold.

In yet another embodiment, the computer-readable instructions, when executed by the at least one processing device, cause the at least one processing device to provide a reward to the first user based on the actionable event and the user data collection, and wherein the reward is exclusive to an interface of a user application.

A computer-implemented method for communication channel integration is also provided. The computer-implemented method comprising: generating a user data collection comprising one or more accounts and interactions associated with a first user, wherein the user data collection is accessible by the first user over a first communication channel; monitoring the user data collection; based on monitoring the user data collection and user interactions, determining an actionable event associated with the first user; identifying a second communication channel associated with the actionable event; and in response to determining the actionable event, automatically integrating the second communication channel into the first communication channel thereby creating a merged communication channel.

In one specific embodiment, the computer-implemented method further comprises displaying at least a portion of the user data collection to the second user over the merged communication channel on a user device associated with the second user.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Embodiments of the invention are directed providing a centralized communication interface for channel integration and interaction expansion. The disclosed embodiments improve user interface technology by merging multiple communication channels into a single hub. Integration of a communication channel may be triggered through an action performed by a user or an identified condition of a user account. The system automatically incorporates a new communication channel into a channel being viewed by the user to enhance the user interaction.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with a resource storage platform and communication channel integration as described herein. As such, the entity may be any institution, group, association, financial institution, merchant, establishment, company, union, authority or the like. Typically, the entity is associated with one or more systems, such as one or more of the systems described herein. Typically, the entity owns, operate, provides, facilitates services associated with, and/or is otherwise associated with at least some of the systems described herein. In some embodiments, an entity may be a third party entity different than the entity and interacts with the systems maintained by the entity.

As described herein, a "user" is an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with the systems herein, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and entity systems described herein. In other embodiments, a user may be a system or an entity performing one or more tasks described herein. In yet other embodiments, a user may be a third party user performing one or more tasks described herein.

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, gaming devices, or any combination of the aforementioned. The device may be used by the user to access the system directly or through an application, online portal, communication interface, internet browser, virtual private network, or other connection channel.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. An interaction may include user interactions with a user interface (e.g., clicking, swiping, text or data entry, etc.), authentication actions (e.g., signing-in, username and password entry, PIN entry, etc.), account actions (e.g., account access, fund transfers, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity.

Typically, the user may provide authentication credentials for conducting user activities or transactions at the entity system. In some embodiments, entity systems require the user to perform one or more authentication steps based on the level of authorization desired for a particular user activity or transaction. In this regard, for example, the user may slide cards with magnetic strips, provide one or more account numbers, user identifiers or userID and the like and further may provide the accompanying personal identification numbers (PIN), passwords, CVV numbers and the like associated with the individual entity system and/or the individual card/account provided for authentication.

Figure 1:
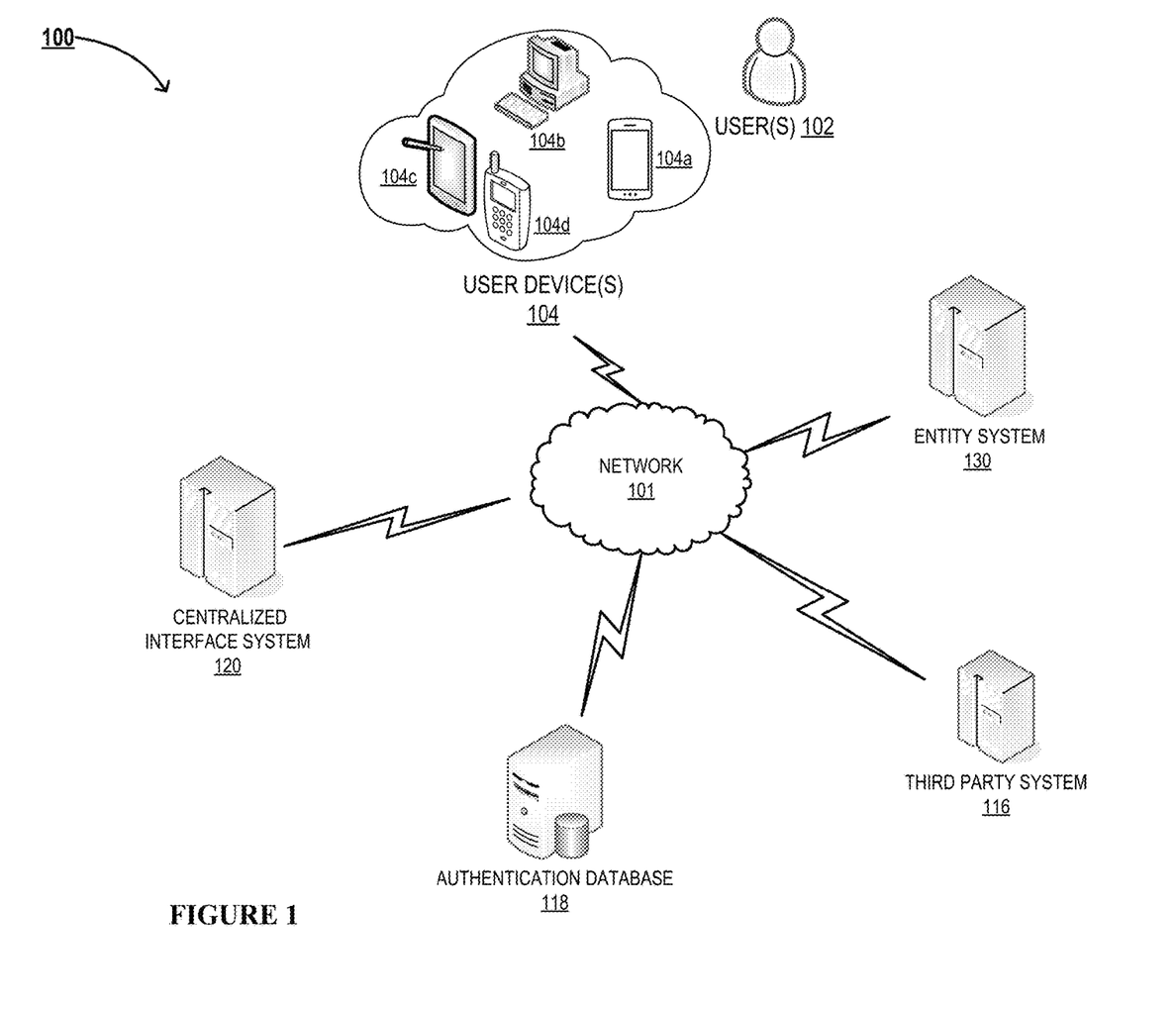
FIG. 1 illustrates a block network architecture diagram illustrating a system environment 100 for providing a centralized communication interface for channel integration and interaction expansion, in accordance with an embodiment of the invention.

Referring to FIG. 1, a block diagram illustrating a system environment 100 configured for providing centralized communication interface for channel integration and interaction expansion, is illustrated, in accordance with some embodiments of the invention. As illustrated, the system environment 100 may comprise a centralized interface system 120, in operative communication with one or more user devices 104a-d associated with a user 102, an entity system 130, an authentication database 118, a third party system 116 and/or other systems/devices not illustrated herein, via a network 101. As such, the centralized interface system 120 is configured such that the user 102 may perform one or more user activities or interactions by utilizing the entity system indirectly via a user device 104 (for example, by physically operating the user device 104 and its interfaces, using input/output devices of the user device 104, using audio commands, using physical gestures, and the like) by establishing operative communication channels between the user device 104 and the centralized interface system 120 via a wireless network and interacting with the centralized interface system 120 via the devices and interfaces of the user device 104).

Typically, the entity system 130 and the authentication database 118 are in electronic communication with the centralized interface system 120, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the centralized interface system 120). In this regard, the wireless communication channel may further comprise near field communication (NFC), communication via radio waves, communication through the internet, communication via electromagnetic waves and the like.

As alluded to previously, the entity system 130 is in operative communication with the centralized interface system 120. In some embodiments, entity system 130 is configured to transmit control instructions that are configured to cause the centralized interface system 120, the user device 104, to perform at least a portion of the steps associated with one or more activities. The entity system 130 may be associated with the same entity as the centralized interface system 120 or may be associated with another entity. The centralized interface system 120 may further communicate with the third party system 116 and/or the authentication database 118, either directly or via the entity system 130. The authentication database 118 may comprise authentication credentials associated with the user. The entity system 130 and/or the centralized interface system 120 may retrieve the authentication credentials from the authentication database to authenticate the user 102 prior to executing one or more user activities, transactions, interactions, or other events described herein.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. As discussed previously, in some embodiments, the centralized interface system 120 of the present invention is configured to establish operative communication channels with the user devices 104 such that, the user 102 may perform one or more user activities over a network 101. The user device 104 is described in detail with respect to FIG. 4.

Figure 2:
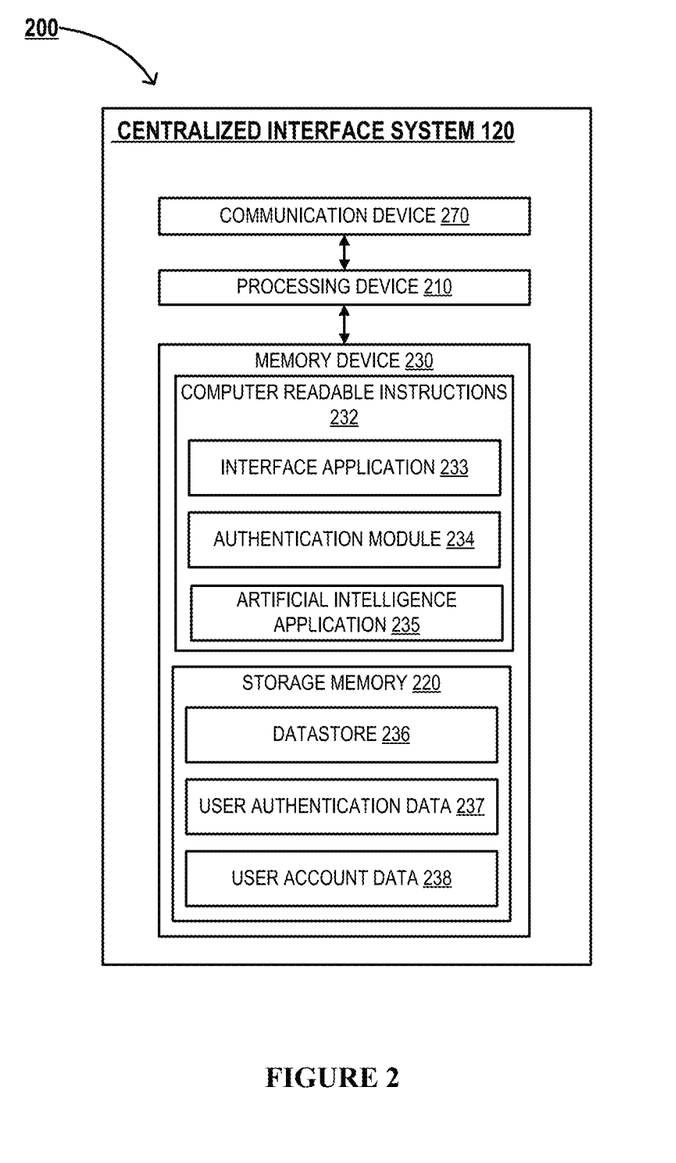
FIG. 2 illustrates a block diagram 200 of a centralized interface system, in accordance with an embodiment of the invention.

FIG. 2 illustrates a block diagram 200 of the centralized interface system 120 system, in accordance with some embodiments of the invention. As discussed previously, the centralized interface system 120 is configured to integrate various communication channels (e.g., between a third party system and a user device) and promote user interactions and user participation in events. System 120 is further configured to provide real-time interactive sessions for the user 102, using one or more communication channels established via the network 101. The centralized interface system 120 is configured to provide a central hub to a user (e.g., a banking or investing client and/or a financial advisor (i.e., third party)). The centralized interface system 120 typically includes a processing device or a processor 210, memory device 230, storage memory 220 or datastore 220, and a communication device 270. As such, the centralized interface system 120, and the processor 210 in particular, is configured to perform at least a portion of the steps of the embodiments described herein, either based on executing computer readable instructions 232 stored in the memory device 230, and/or based on receiving instructions, indications, or signals from other systems and devices such as the entity system 130, the user device 104, the third party system 116, the user 102, and/or other systems. In some embodiments, the entity system 130 or user device 104 is configured to transmit control instructions to and cause the processing device 210 to perform one or more steps of the embodiments presented herein. For example, the user device system 104 may detect a trigger event and transmit an indication to the processing device 210. In response to receiving the control signal from the system 130, the processing device 210 may initiate a presentation of resources, offers, communications, or the like.

The processing device 210 may generally refer to a device or combination of devices having circuitry used for implementing the communication and/or logic functions of the centralized interface system 120. For example, the processing device 210 may include a control unit, a digital signal processor device, a microprocessor device, and various analog-to-digital converters, digital-to-analog converters, and other support circuits and/or combinations of the foregoing. Control and signal processing functions of the centralized interface system 120 may be allocated between these processing devices according to their respective capabilities.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium. For example, the memory device 230 and/or the storage memory 220 may include any computer memory that provides an actual or virtual space to temporarily or permanently store data and/or commands provided to the processing device 210 when it carries out its functions described herein.

As illustrated by FIG. 2, the memory device 230 typically comprises an interface application 233, an authentication module 234, an entity system application datastore 236 stored therein. In some embodiments, the authentication module 234 is integral with the interface application 233 and configured to authenticate a user. In some embodiments, the entity interface application 233 and/or the authentication module 234 may be executable to initiate, perform, complete, and/or facilitate one or more portions of any embodiment described and/or contemplated herein, either independently or in response to receiving control instructions from the entity system 130 or the user device 104. In some embodiments, the interface application/module 233 comprises computer readable instructions stored in the memory device 230, which when executed by the processing device 210, are configured to cause the processing device 210 to perform one or more steps of the embodiments presented herein, and/or cause the processing device to transmit control instructions to other components of the user device 104 and other devices/systems in the network 101 to cause them to perform the steps. Generally, the interface application 233 is executable to receive activity instructions from the user and perform user activities and the various steps described herein. In some embodiments, the interface application 233 comprises a personal digital assistant or artificial intelligence (i.e., through artificial intelligence application 235) for assisting in interfacing with the user at the user device 104 and collecting and patterning data associated with the user 102. The interface application 233 and/or the artificial intelligence application 235 may be coupled to a datastore 236 for storing application data as the user activity is being performed. The datastore 236 may store the application data temporarily for the predetermined duration of the execution of the activity (such as a memory buffer, or cache memory), or permanently.

The centralized interface system 120 may require users to identify and/or authenticate themselves before the centralized interface system 120 may initiate, perform, complete, and/or facilitate a user activity. For example, in some embodiments, the centralized interface system 120 is configured (and/or the interface application 233 is executable) to authenticate a user based at least partially on authentication information such as, but not limited to, a debit card, smart card, token (e.g., USB token, etc.), username, password, PIN, biometric information, and/or one or more other credentials that the user presents to the centralized interface system 120. Additionally or alternatively, in some embodiments, the centralized interface system 120 is configured to authenticate a user by using one-, two-, or multi-factor authentication. For example, in some embodiments, the centralized interface system 120 requires two-factor authentication, such that the user must provide a valid debit card and enter the correct PIN associated with the debit card in order to authenticate the user to the centralized interface system 120. However, either alternatively or in addition to the aforementioned authentication features, the centralized interface system 120 may require biometric authentication of the user 102 before initiating, performing, completing, and/or facilitating a user activity.

In some embodiments, the authentication module 234 comprises computer readable instructions that when executed by the processing device 210 cause the processing device to perform one or more functions and/or transmit control instructions to other components or devices to perform one or more authentication steps described herein. These authentication steps typically include requesting authentication credentials from the user via the user output devices (for example, based on determining the desired authorization level for the user activity), activating pertinent sensors and devices for receipt of the credentials (sensor devices/image capture devices for biometric credentials, card reader devices for reading magnetic strips of the user's card(s), contact less interface device for receiving authentication tokens from a user device via NFC channels, and the like), receiving authentication credentials, validating the credentials (for example based on retrieving user credentials from the datastore 236, memory 220, entity system 130 and/or database 118), and the like. That said, as shown, the processing device 210, in turn, is operatively connected to and is also configured to control and cause the communication device 270, the memory device 230, and other components described herein to perform one or more functions, at least in part. In some embodiments, the memory 220 may further comprise user authentication data 237 and/or user account data 238. In other embodiments, the user authentication data 237 and/or user account data 238 is accessed by the centralized interface system 120 from the entity system 130 over the network.

The communication device 270 may comprise a modem, a receiver, a server, a transmitter, transceiver, and/or another device for communicating with other devices and systems on the network 101. The communication device 270 may further comprise a contact, contactless, wireless and/or wired interface that is configured to establish communication between components of the centralized interface system 120, between the centralized interface system 120, particularly the processing device 210, and other devices or systems, such as the entity system 130, the user device 104, the authentication database 118, the third party system 116, and the like. In this regard, the communication interface 270 comprises a transmitter, a receiver, a broadcasting device to transmit and receive signals from corresponding devices via a suitable transmission medium or a communication channel.

Establishing the communication channels may also include signaling information in accordance with the air interface standard of the applicable cellular system of the wireless telephone network that may be part of the network 101. In this regard, the centralized interface system 120 may be configured to operate with one or more air interface standards, communication protocols, modulation types, and access types to communicate with other systems such as the user device 104 and the entity system 130. By way of illustration, the centralized interface system 120 may be configured to operate in accordance with any of a number of first, second, third, and/or fourth-generation communication protocols and/or the like. For example, the centralized interface system 120 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The centralized interface system 120 may also be configured to operate in accordance with non-cellular communication mechanisms, such as via a wireless local area network (WLAN) or other communication/data networks.

Furthermore, a "user interface" (not illustrated) may be associated with the centralized interface system 120 and may generally include a plurality of interface devices and/or software that allow a user to input commands and data to direct the processing device to execute instructions. In some embodiments, the centralized interface system 120 is configured to transmit the user interface to the user device 104, wherein the user device 104 is controlled to display the user interface for interacting with the centralized interface system 120. In one example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the user device 104 or the third party system 116. As another example, the user interface may be provided on the user device 104 that may be controlled by the central interface system 120 and/or the entity system 130 either directly or via the processing device 210 of the centralized interface system 120.

Figure 3:
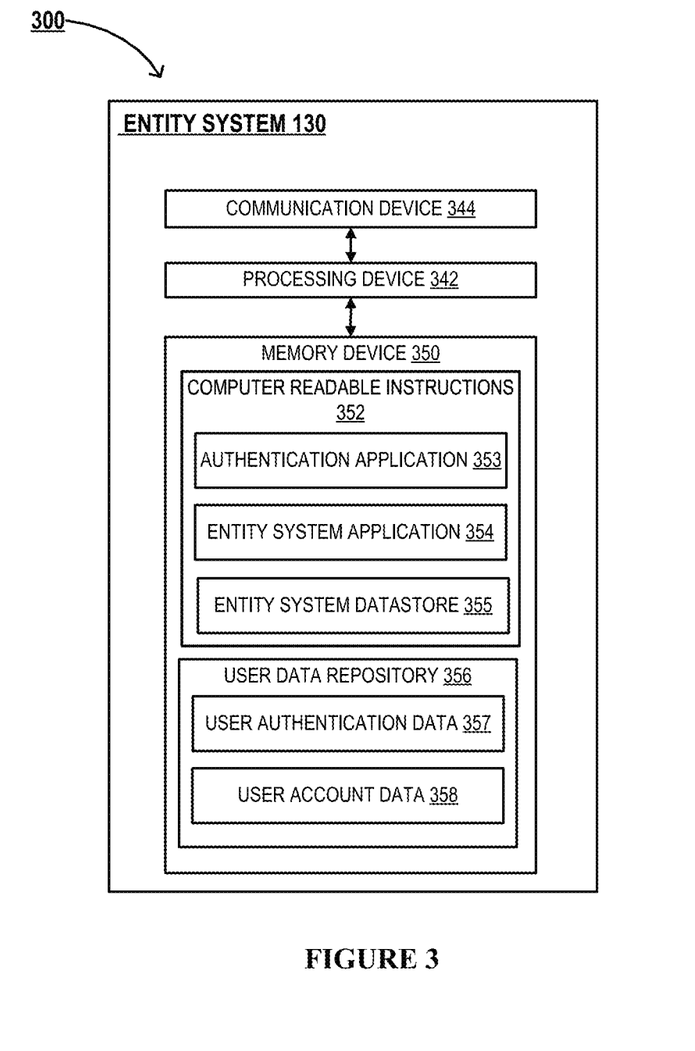
FIG. 3 illustrates a block diagram 300 of an entity system, in accordance with an embodiment of the invention.

FIG. 3 illustrates a block diagram 300 of the entity system 130, in accordance with some embodiments of the invention. As illustrated in FIG. 3, the entity system 130 may include a communication device 344, a processing device 342, and a memory device 350 having an authentication application/module 353, an entity system application 354 and an entity system datastore 355 stored therein. As shown, the processing device 342 is operatively connected to and is configured to control and cause the communication device 344, and the memory device 350 to perform one or more functions. Furthermore, in some embodiments, the processing device 342 is configured to control and cause the processing device 210 of the centralized interface system 120 to perform one or more functions. In some embodiments, the authentication application 353 and/or the entity system application 354 comprises computer readable instructions that when executed by the processing device 342 cause the processing device 342 to perform one or more functions and/or transmit control instructions to the centralized interface system 120, the authentication database 118, the third party system 116, the user device 104, and/or the communication device 344. It will be understood that the authentication application 353 and/or the entity system application 354 may be executable to initiate, perform, complete, and/or facilitate one or more portions of any embodiments described and/or contemplated herein, and specifically embodiments directed to user activities. The authentication application 353 may comprise executable instructions associated with one or more authentication steps of user activities and may be embodied within the entity system application 354 in some instances. In some embodiments, the authentication application 353 is similar to the authentication module 234 described previously. The entity system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 344 may generally include a modem, server, transceiver, and/or other devices for communicating with other devices on the network 101. The network communication device 344 may be a communication interface having one or more communication devices configured to communicate with one or more other devices on the network 101, such as the entity system 130, the sensor devices 112, and visual capture devices 114, other processing systems, data systems, etc.

Additionally, referring to the entity system 130 illustrated in FIG. 3, the processing device 342 may generally refer to a device or combination of devices having circuitry used for implementing the communication and/or logic functions of the entity system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the entity system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

The memory device 350 within the entity system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the entity device 342 when it carries out its functions described herein. In some embodiments, the centralized interface system 120 may be used by a third party/entity 116 to interact with the entity system 130, based on providing requisite authorization or authentication credentials. The entity system 130 may further comprise a user data repository 356 comprising user authentication data 357 and user account data 358. The processing system 130 may utilize the authentication data 357 to validate user authentication credentials. Furthermore, the account data 358 may reflect the current account data of the user. In some embodiments, the user account data 358 may comprise a record or account of one or more user resources, offers, or the like.

Figure 4:
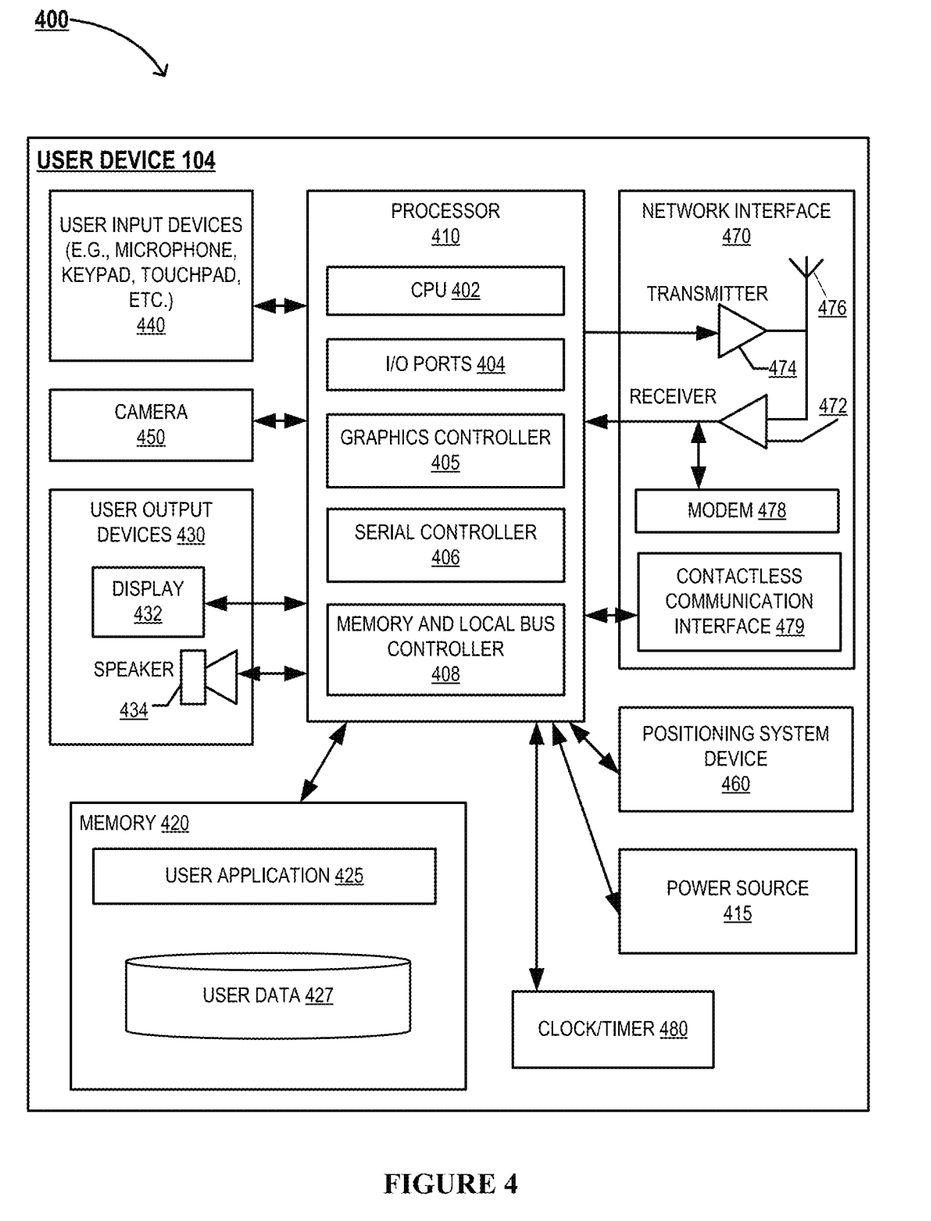
FIG. 4 illustrates a block diagram 400 of a user device, in accordance with an embodiment of the invention.

FIG. 4 illustrates a block diagram 400 of the user device 104, such as a user mobile device, in accordance with some embodiments of the invention. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, gaming devices, laptop computers, cameras, video recorders, audio/video player, radio, GPS devices, any combination of the aforementioned devices.

The mobile device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408.

The processor 410 may include functionality to operate one or more software programs or applications, which may be stored in the memory device 420. For example, the processor 410 may be capable of operating applications such as the user application 425 or a web browser application. The user application 425 may then allow the mobile device 104 to transmit and receive data and instructions from the centralized interface system 120 (for example, via wireless communication or NFC channels), data and instructions from the entity system 130, web content, such as, for example, location-based content and/or other web page content, according to a Wireless Application Protocol (WAP), Hypertext Transfer Protocol (HTTP), and/or the like.

The user device 104 may include the necessary circuitry to, through the included functions of the user application 425 with access to the user data 427 (e.g., user identifying information, authentication information, financial data, or the like), provide token storage and transmission functionality, transmitter device signal encoding and decoding functionality, for secure transmission of financial and authentication credential tokens via the contactless communication interface 479 to the centralized interface system 120. That said, in some embodiments the user application 425 is pre-installed on the user device 104, while in other embodiments, the centralized interface system 120 may transmit and cause installation of the application 425 based on determining that the user device 104 does not comprise the application 425, when the user device attempts to connect with the centralized interface system 120 and/or the entity system 130.

The processor 410 may be configured to use the network interface device 470 to communicate with one or more other devices on a network 101 such as, but not limited to the centralized interface system 120 and the processing system 130. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the mobile device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the mobile device 104 to receive data from the user 102, may include any of a number of devices allowing the mobile device 104 to receive data from a user 102, such as a keypad, keyboard, touchscreen, touchpad, microphone, mouse, joystick, other pointer device, button, soft key, and/or other input device(s).

The mobile device 104 may further include a power source 415. Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 415 may be a power adapter that can connect a power supply from a power outlet to the mobile device 104. In such embodiments, a power adapter may be classified as a power source "in" the mobile device 104.

The mobile device 104 may also include a memory buffer, cache memory or temporary memory device operatively coupled to the processor 410. Typically, one or more applications 425, are loaded into the temporarily memory during use. As used herein, memory may include any computer readable medium configured to store data, code, or other information. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the centralized interface system 120 performing one or more steps described herein in conjunction with other devices and systems, either automatically based on executing computer readable instructions of the memory device 230, or in response to receiving control instructions from the entity system 130 or user device 104. In some instances, the system refers to the entity system 130. In some instances, the system refers to the devices and systems on the network environment 100 of FIG. 1. The features and functions of various embodiments of the invention are be described below in further detail.

In some embodiments, the present invention provides a centralized hub to the user via the user interface on the user device, wherein the user is presented with a holistic view of resources (e.g., account balances, accumulated auxiliary resource amounts (i.e., reward points), added or situational resources (i.e., offers and discounts), and the like in a single, multivariable digital space. In some embodiments, the system may integrate third party resource accounts or vehicles (e.g., accounts, credit cards, rewards, offers) into the centralized user interface with user authentication of third party resource accounts, wherein the resources from entities are aggregated in the user interface application. In some embodiments, the system may further comprise an optimization engine for optimizing resources based on collected user data (i.e., interaction (e.g., spend) history, life priorities, target resource values (i.e., financial goals), account actions, and the like). In one embodiment, the system may convert all reward currencies on the user interface account to a single universal resource usable in various banking environments (e.g., internal and external to the entity).

In some embodiments, the system is configured to expand user interaction with the entity, the entity systems, the third party entities, other users, or the like, wherein the system is configured to promote additional interactions by the user or additional users with the entity. Interactions promoted by the system may include, but are not limited to, product offers (e.g., new account offers, external third party offers, new relationships (i.e., accounts)), signing up for paperless billing, signing up for misappropriation alerts, scheduling advising meetings, and the like.

In some embodiments, the system is configured to promote expansion of relationships with the entity and/or a financial advisor of the user, wherein the system encourages additional interaction between the user and/or additional users and the entity and/or financial advisor. For example, the system may encourage the user to schedule a meeting with the financial advisor to review the user's accounts. In some embodiments, the system may be configured to promote the user to set saving, spending, or other financial milestone goals (e.g., retirement goals, college saving goals), wherein the user sets a target threshold value or limit to track user resource usage and appreciation. In some embodiments, the system may be configured to transfer user resources and rewards to other users (e.g., family members, other entity clients, or the like).

In some embodiments, the system is configured to promote expansion of additional user interaction by providing resources in return for the user performing one or more additional actions or interactions. In some embodiments, the system may be configured to provide monetary resources such as cash, reward currencies, gift cards, discounts, offers, coupons, travel deals, or the like to the user. In other embodiments, the system may be configured to provide experiences or activities to the user in return for the user performing requested actions. In some embodiments, the system may be configured to provide unique, exclusive, one-of-a-kind, or non-monetary offers or experiences to user (e.g., concerts, shows, vacations, tours, etc.). In some embodiments, the experiences are only available through the promoted interaction program. In this way, the system may attempt to promote users to further develop relationships with the entity and/or financial advisors.

The system is configured to generate a user database for each user. In some embodiments, the system builds the user databases using historical interaction or transaction data, other non-monetary data (e.g., social media data), user action data, monetary and non-monetary goals, and the like. In this way, the system may leverage the user database to tailor offered promotions to the user and further attempt to expand entity interactions. For example, the system may determine that an investment client is a foodie based on the user's interaction history at restaurants and purchases of culinary implements and cookbooks. In response, the system may promote the client with an exclusive offer to attend a private cooking demonstration with a famous chef. In some embodiments, the entity maintaining the system may partner with external experts or institutions for providing promotes to the user based on the user database. In another example, the system may be configured to offer a client college financing or access to a financial advisor in response to a user-defined goal of college tuition saving. The system may use analytics to determine patterns for user databases. In some embodiments, the system utilizes artificial intelligence and deep learning technologies to determine user interaction patterns, build and develop user database, and tailor promotions.

In some embodiments, the system may be configured to promote a user action associated with account maintenance, investment planning, saving goals, and the like. For example, the system may be configured to provide an promote or reward to a user for meeting a savings goal, reaching an anniversary of a relationship with the entity (e.g., account has been open a predetermined amount of time), maintaining a regular deposit schedule, and/or other milestones, goals, events, or the like. In some embodiments, the system may monitor user resource inflows and outflows, wherein upon a user resource amount reaching a predetermined threshold, the system may reward the user. In yet another embodiment, the system may determine that a user regularly deposits a bonus in an account with the entity annually, wherein the system may be configured to promote the user with offers or the like to deposit the bonus again within a determined time period before the user has regularly deposited the bonus in the past (i.e., 1 month prior).

In some embodiments, the system tailors features (i.e., account features, credit card features, reward features) for the user based on the user database, wherein the user database includes features used and features not used by the user. In this way, the system and entity may provide the user with meaningful and desirable features to the user that are more valuable to the user without wasting resources on unused features. For example, the system may determine that the user travels frequently based on the interaction history of the user. In response, the system may select from a list of available features, for example, free flight check-in as a feature for the user. Alternatively, the system may determine that a second user travels infrequently and not offer the same feature to the second user.

In some embodiments, the system may promote a user to attend an event such as a prospective investment event, financial information meeting, social event, or the like. For example, the system may transmit a notification to the user within the user interface or other communication channel notifying the user of an upcoming prospective investment event, wherein the user is encouraged to attend and interact with potential financial advisors. The user may be further rewarded for expanding relationships with the entity or financial advisor at the event (e.g., opening a new account). In some embodiments, the system may further promote the user to bring additional users, wherein the original user may be further promoted for each of the additional users that create or expand interactions or relationships at the event (i.e., open new accounts). In some embodiments, a user may only be promoted by the system if the user has a preexisting account with the entity through the user interface. In other embodiments, users without preexisting accounts may be promoted by the system to create new interactions or relationships with the entity and/or register for the user interface application.

Generally, in some embodiments, the centralized interaction system described herein is configured to integrate and connect multiple, sometimes disparate, communication channels within a centralized interface which acts as a communication hub for various users such as financial advisors and clients of the financial advisor. The interface provided by the present invention acts as a hub allowing for the financial advisor to have access to an account interface space and the user database and information provided therein which is normally only provided to the user (i.e., client) by an entity such as an entity maintaining an account of the user. In some embodiments, the system integrates a secure communication channel between a user and the entity system with a communication channel to a third party (e.g., a financial advisor) associated with the user via a third party system. In some embodiments, the system presents the same information to the financial advisor as is presented to the user in the digital space of the interface. In this way, the financial advisor may be more involved and gain insight to better provide guidance to his or her client over the communication channel thereby improving not only the client-advisor relationship as well as the advisor-entity relationship by providing the advisor with additional access.

In one embodiment, the system may provide a communication vehicle for a financial advisor user of the system to transmit messages to a client within the interface. In another embodiment, the system may integrate a video stream communication from a financial advisor (internal or third party) into a presentation of the user interface digital space of the user, wherein the system enables the user to communicate with the financial advisor within the digital space while reviewing the user's resources or accounts. In this way, the system is configured to integrate a video stream and/or message communication from the financial advisor into the user interface, wherein the communication channel (e.g., a video call application or window) is spaced or arranged within the user interface so as not to disrupt a user's ability to simultaneously view the user resource accounts. Similarly, as the system is configured to present similar or the same information to the advisor as the client user, the system may be configured to provide an integrated video communication interface to the user similar to one presented to the client as described above with the video communication with eh client integrated into the advisor-facing user interface. In these ways, the system improves upon not just banking, but user interfaces in general by improving user relationship with the entity (both client and financial advisor). Furthermore, the system integrates the communication channels into the user interface without requiring that the user exit the user interface of the banking application or portal or open a separate communication channel.

In some embodiments, the system is configured to provide action notifications or alerts to a financial advisor through the user interface as a result of an event or action associated with the client. In some embodiments, the system provides a dashboard to financial investors displaying the notifications and alerts. For example, the system may generate an alert in response to a client user event or action such as clicking on a link to create a new account, lingering on a certain page for predetermined period of time (i.e., indicating a requirement for assistance or indecisiveness, interest in opening a new account, other interaction), or the like. In some embodiments, the system may generate a link on an interface dashboard in response to the notification or alert, wherein upon clicking the link, the system automatically opens a communication channel from the financial advisor or other third party to the user interface or other user device of the client user (e.g., phone, online chat, email, text, video) and integrates the communication channel into the user interface, wherein the financial advisor may communicate with the user pending user approval. In some embodiments, the dashboard is configured to allow the financial advisor and/or client to save or pin alerts or notifications to the dashboard for future meetings. In this way, the user may immediately act on the alert or notification or wait until a later meeting.

In some embodiments, the system may further comprise an optimization engine or tool to assist a user (i.e., client and/or financial advisor) in managing resource investments, rewards, benefits, offers, or the like by providing alerts or notifications for nearly available benefits. For example, the system may display a message to a user on a user device to optionally spend/save another $X to trigger more rewards. In some embodiments, the system may be configured to generate and display figures or graphics illustrating benefit realization of a user. For example, the system may generate a notification or display to a user that the user is only using 3 out of 4 of available features, or further, notify or display the benefits if the user were to user all of the available features.

In some embodiments, the system provides a suite of tools, calculators, and the like to the user (i.e., client and/or financial advisor) with the provided user interface of the displayed application. In one embodiment, the system provides a rewards calculator, wherein the calculator generates a notification or display to the user of available rewards. For example, the system may determine and generate a notification notifying the user of actions that could be performed by a deadline in order to receive additional benefits.

In another embodiment, the system includes a calculator for tracking and projecting resource inflows and outflows. For example, the calculator may display that that a user has X resources coming in and Y resources going out. The calculator may further display projected flows, wherein if the user had Z resources, then certain benefits may be available or other projected actions may be available or recommended. In some embodiments, the system may recommend switching services (e.g., accounts) from other, external entities to the internal entity by displaying or notifying that if the user switched to the internal entity, certain benefits may be available. In yet another embodiment, the calculator may display a projected amount of rewards associated with a resource amount in order to promote a user to transfer the resource amount to an account such as an account associated with the entity. For example, the system may notify the user that a resource amount (e.g., an ACH transfer) would be worth X with Y accumulated rewards if the resource amount were instead transferred to the internal entity or another specific account or resource location.

In some embodiments the system may provide value modeling for accumulated value, credit cards, investments, account deposits (internally and those with competing external entities). In some embodiments, the system may display onboarding information for if an amount of user resources were instead brought to the internal entity. In one embodiment, the system is further configured to reduce a disruption of a user resource transfer or account switch from another entity to the internal entity by automatically bring the resources to the internal entity for the user. For example, the system may automatically change an automatic bill payment from another entity to the internal entity pending the user's approval.

In some embodiments, the tools, calculators, and optimization tools and engine leverage artificial intelligence and deep learning technologies to provide analyses and projected resource amounts to users.

Figure 5:
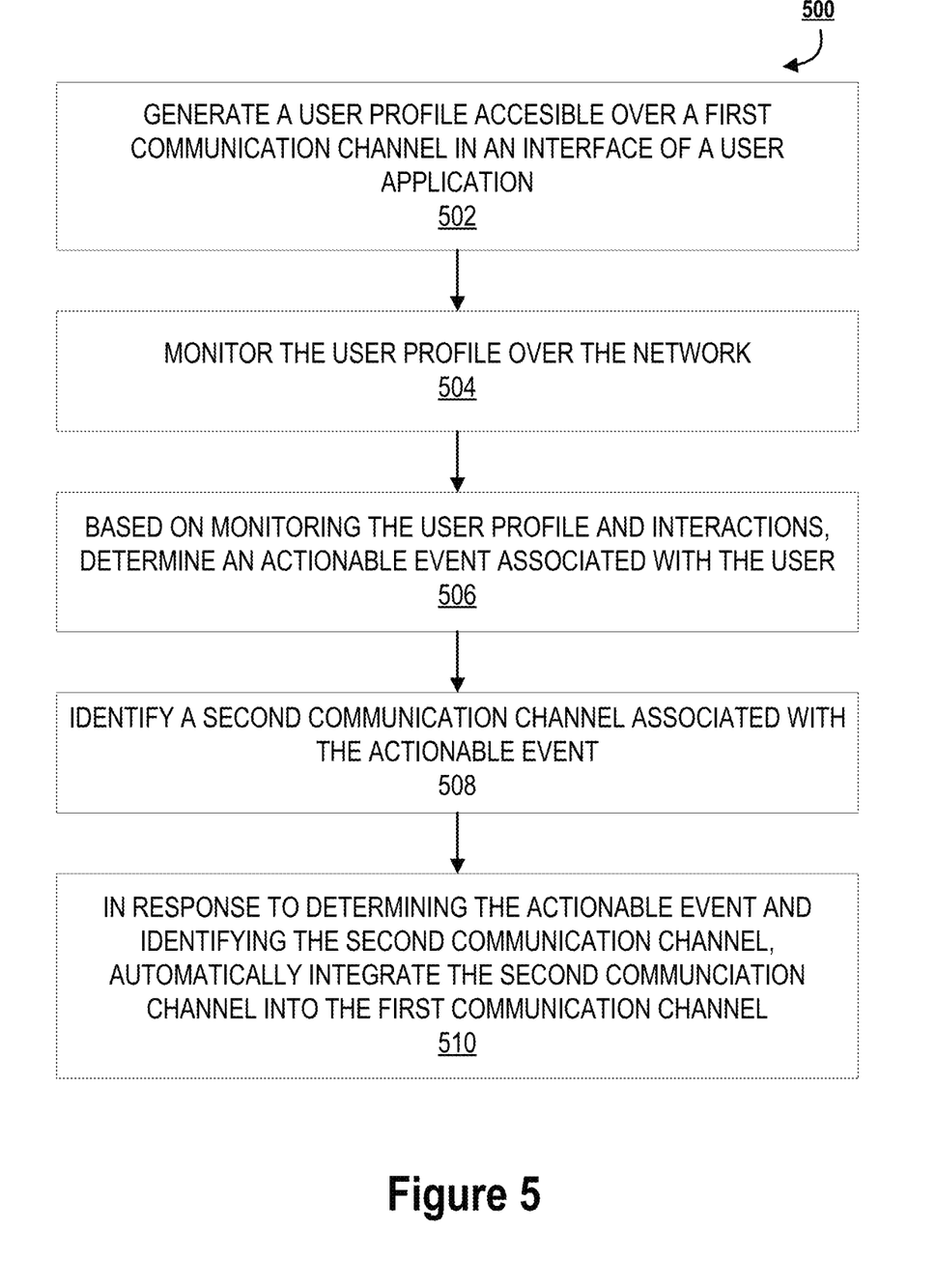
FIG. 5 provides a high level process flow for communication channel integration, in accordance with one embodiment of the invention.

FIG. 5 provides a high level process flow 500 illustrating communication channel integration, in accordance with one embodiment of the present invention. As illustrated in block 502, the system initially generates a comprehensive user database associated with a user, such as an account holder, customer, or the like. In some embodiments, the user database comprises one or more resource storage locations (e.g., accounts), interaction history associated with the user, and other information and data associated with the user (e.g., user-identifying information). In some embodiments, the system combines one or more accounts from across several, disparate entities to generate a central hub for the user which presents all of the user's relationships, accounts, and the like to the user in one location. In this way, the user is not required to navigate to multiple entity pages. The user database is configured to be accessible by the user over a communication channel within a user interface of a user application, such as user application 425 on user device 104.

As illustrated in block 504, the system monitors the user database, specifically, in one embodiment, the account activity and interactions associated with the user. As illustrated in block 506, The system is configured to monitor the user database to identify and determine one or more actionable events associated with the user, wherein identification of an actionable event triggers a response from the system. An actionable event may include any user interaction, actions, event, or communication as described previously herein. In one example, an actionable event may include a duration of a user account exceeding a predetermined threshold (e.g., user account anniversary). In another embodiment, the actionable event may include a resource amount stored in an account exceeding or falling below a predetermined threshold (e.g., savings goals or spend limits). In yet another embodiment, an actionable event may include a user interacting with the user interface via an input device of a user device (e.g., a user clicks a link via a touchscreen display).

As illustrated in blocks 508 and 510, the system identifies another communication channel associated with the actionable event and automatically integrates another communication channel into the original communication channel thereby creating a merged communication channel within the interface of the user application. In some embodiments, the second communication channel is, for example, a video communication channel (e.g., a streaming video call), an audio communication channel (e.g., a phone call), and/or a text communication channel (e.g., a text or online chat box). The second communication channel may be incorporated into the user interface within the user application to provide simultaneous viewing without requiring a user to navigate a way from the original communication channel of the user application. In some embodiments, the system is configured to adjust or reposition items displayed in the user interface to accommodate display of the second communication channel. In one example, the system may open a text chat box within the user application to allow for the user to communicate with another user (e.g., a financial resource advisor, an entity representative, customer support technician, or the like) while simultaneously viewing the user database.

In some embodiments, the second communication channel is associated with a second user, wherein the system displays at least a portion of the user database to the second user over the merged communication channel on another user device associated with the second user. In this way, the second user can also view at least some of the information of the user database with the first user. For example, a financial resource advisor may be connected through another communication channel which is incorporated into the user database of a client of the advisor, wherein the advisor may be enabled to better aid and advise the user, as both users are able to view the same content of the user database in real-time. In one embodiment, the second user may be a third party separate from the first user and an entity managing the user database. For example, a third party financial resource advisor may be connected with a client to view the client's resources and accounts held at a bank not associated with the third party advisor to provide a holistic view of the client's resources to both the client and the advisor.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for communication channel integration, the system comprising:
   a memory device with computer-readable program code stored thereon;
   a communication device connected to a network; and
   at least one processing device, wherein the at least one processing device is configured to execute the computer-readable program code to:
      generate a user data collection comprising one or more accounts and interactions associated with a first user, wherein the user data collection is accessible by the first user over a first communication channel;
      based on monitoring the user data collection and user interactions, determine an actionable event associated with the first user;
      identify a second communication channel associated with a second user and associated with the actionable event;

in response to determining the actionable event, automatically integrate the second communication channel into the first communication channel thereby creating a merged communication channel; and display at least a portion of the user data collection to the second user over the merged communication channel on a user device associated with the second user.

2. The system of claim 1, wherein the at least one processing device is further configured to execute the computer-readable program code to request permission from the first user before integrating the second communication channel into the first communication channel.

3. The system of claim 1, wherein the second communication channel is associated with a third party resource advisor.

4. The system of claim 1, wherein the second communication channel comprises at least one of a video communication, an audio communication, and a text communication.

5. The system of claim 1, wherein the actionable event is a user interaction with an input device, the first user interacting with an interface displayed by a user application.

6. The system of claim 1, wherein the actionable event comprises a duration of the one or more accounts exceeding a predetermined threshold.

7. The system of claim 1, wherein the actionable event comprises a resource amount stored in the one or more accounts exceeding a predetermined threshold.

8. The system of claim 1, wherein the at least one processing device is further configured to execute the computer-readable program code to provide a reward to the first user based on the actionable event and the user data collection, and wherein the reward is exclusive to an interface of a user application.

9. A computer program product for communication channel integration, wherein the computer program product comprises at least one non-transitory computer-readable medium comprising computer-readable instructions, the computer-readable instructions, when executed by at least one processing device, cause the at least one processing device to:

generate a user data collection comprising one or more accounts and interactions associated with a first user, wherein the user data collection is accessible by the first user over a first communication channel;

based on monitoring the user data collection and user interactions, determine an actionable event associated with the first user;

identify a second communication channel associated with the actionable event;

in response to determining the actionable event, automatically integrate the second communication channel into the first communication channel thereby creating a merged communication channel; and display at least a portion of the user data collection to the second user over the merged communication channel on a user device associated with the second user.

10. The computer program product of claim 9, wherein the computer-readable instructions, when executed by the at least one processing device, cause the at least one processing device to request permission from the first user before integrating the second communication channel into the first communication channel.

11. The computer program product of claim 9, wherein the second communication channel is associated with a third party resource advisor.

12. The computer program product of claim 9, wherein the second communication channel comprises at least one of a video communication, an audio communication, and a text communication.

13. The computer program product of claim 9, wherein the actionable event is a user interaction with an input device, the first user interacting with an interface displayed by a user application.

14. The computer program product of claim 9, wherein the actionable event comprises a duration of the one or more accounts exceeding a predetermined threshold.

15. The computer program product of claim 9, wherein the actionable event comprises a resource amount stored in the one or more accounts exceeding a predetermined threshold.

16. The computer program product of claim 9, wherein the computer-readable instructions, when executed by the at least one processing device, cause the at least one processing device to provide a reward to the first user based on the actionable event and the user data collection, and wherein the reward is exclusive to an interface of a user application.

17. A computer-implemented method for communication channel integration, the computer-implemented method comprising:

generating a user data collection comprising one or more accounts and interactions associated with a first user, wherein the user data collection is accessible by the first user over a first communication channel;

based on monitoring the user data collection and user interactions, determining an actionable event associated with the first user;

identifying a second communication channel associated with the actionable event;

in response to determining the actionable event, automatically integrating the second communication channel into the first communication channel thereby creating a merged communication channel; and displaying at least a portion of the user data collection to the second user over the merged communication channel on a user device associated with the second user.

18. The computer-implemented method of claim 17, further comprises requesting permission from the first user before integrating the second communication channel into the first communication channel.

19. The computer-implemented method of claim 17, wherein the second communication channel is associated with a third party resource advisor.

20. The computer-implemented method of claim 17, wherein the second communication channel comprises at least one of a video communication, an audio communication, and a text communication.

* * * * *